United States Patent [19]
Dame-Cahagne et al.

[11] Patent Number: 5,358,730
[45] Date of Patent: Oct. 25, 1994

[54] PROCESS FOR COAGULATING OR GELLING A NONDENATURED PROTEIN AND PRODUCT THEREOF

[75] Inventors: Michèle Dame-Cahagne, Gif sur Yvette; Pascale Mouret, Nogent le Roi; André Frouin, Versailles; Yves Audidier, Verriers-le-Buisson, all of France

[73] Assignee: Bongrain S.A., Guyancourt, France

[21] Appl. No.: 930,695

[22] PCT Filed: Feb. 10, 1992

[86] PCT No.: PCT/FR92/00113
§ 371 Date: Dec. 7, 1992
§ 102(e) Date: Dec. 7, 1992

[87] PCT Pub. No.: WO92/14367
PCT Pub. Date: Sep. 3, 1992

[30] Foreign Application Priority Data
Feb. 8, 1991 [FR] France .................. 91 01450

[51] Int. Cl.$^5$ ............................................. A23L 1/0562
[52] U.S. Cl. .................................... 426/573; 426/580; 426/582; 426/583; 426/656; 426/657
[58] Field of Search ............... 426/573, 656, 582, 583, 426/657, 580

[56] References Cited
U.S. PATENT DOCUMENTS
5,217,741 6/1993 Kawachi et al. .................. 426/573

FOREIGN PATENT DOCUMENTS
0261586 3/1988 European Pat. Off.
0366541 5/1990 European Pat. Off.

OTHER PUBLICATIONS
Sagara, "Preparation of Cheese Curd", Patent Abstracts of Japan, vol. 12, No. 338 (C-527), Sep. 1988.
Raynes et al, "Sensory and curd characteristics of cottage cheese manufactured from 16% total solid retentate", Journal of Dairy Science, vol. 71, Suppl. 1, 1988, p. 81, Abstract No. D59.
Maubois et al, "Making Ricotta cheese by ultrafiltration", Journal of Dairy Science, vol. 61, No. 7 Jul. 1978, pp. 881–884.

*Primary Examiner*—Helen Pratt
*Attorney, Agent, or Firm*—Cushman, Darby & Cushman

[57] ABSTRACT

Method for instantaneous gelling or coagulation, in the absence of coagulant agent, at a pH higher than its isoelectric pH, of a coagulable protein at said isoelectric pH, characterized in that an aqueous solution is used as starting product, wherein the aqueous solution is in a nondenatured status, and contains at least one such coagulable protein, the alkaline ion content of said solution is adjusted to a predetermined value, and is brought to a concentration at least equal to 1.5% at a temperature selected as desired between 20° and 100° C. The predetermined value is such that the protein coagulates instantaneously, at the above concentration and pH, and temperature; to obtain the coagulum. Application of such coagulums to obtain semi-solid or solid food products containing animal proteins such as milk proteins or vegetable proteins such as soya proteins.

43 Claims, No Drawings

PROCESS FOR COAGULATING OR GELLING A NONDENATURED PROTEIN AND PRODUCT THEREOF

The present invention relates to a process for instantaneous coagulation or gelling, in the absence of a coagulating agent, at a pH higher than its isoelectric pH, of a protein coagulable at the said isoelectric pH.

The invention also relates to a coagulum or gel which can be obtained by the said process and to the use of such a coagulum or gel in the preparation of a foodstuff.

The process of the invention is applicable, in particular, to milk caseins and to analogous proteins.

In the description which follows reference will most often be made, with the aim of simplification, to the coagulation of milk or of dairy products, but it must be understood that this reference to dairy products must not be regarded as limiting.

The coagulation of milk results from physico-chemical changes which take place at the level of the casein micelles. The two types of coagulation known to date and widely used in dairy and cheese technology are induced either by the action of coagulant enzymes, such as, for example, rennet, or by acidification to the isoelectric pH of the caseins, and produce a coagulum which is also termed "curd" and a liquid residue known as whey.

The action of rennet is reflected in attack on kappa-casein, which is cut at the level of the 105 and 106 residues, and gives rise to changes in the micelle: the net charge is reduced and the surface of the micelle becomes more hydrophobic. These changes modify the equilibria between the attractive and repellent forces between the micelles and, when the degree of hydrolysis of the kappa-casein is sufficient, coagulation, and the formation of a network of para-casein micelles, takes place.

The acidification of milk is also reflected in a coagulation, by a similar process (fall in the absolute value of the zeta potential) when the isoelectric pH of casein is reached, but the micelles are not preserved: in fact, colloidal calcium phosphate, which stabilized the micelles, is dissolved by the acidification. The lactic curds are therefore substantially decalcified, the minerals being entrained with the serum.

It is also known that caseins, in their natural environment, are remarkably stable to heat treatments: in fact, milk must be treated under pressure at temperatures of the order of 130° C. for 10 to 15 minutes, or at 115° C. for 50 minutes, in order for flocculation to be observed; see, for example, C. ALAIS, Science du lait, 4th edition, Editions SEPAIC, Paris, page 163.

The whey proteins are more sensitive to heat. For example, beta-lactoglobulin has a denaturing temperature of the order of 80° C. However, in milk, it does not precipitate at this temperature but bonds to the kappa-casein. In fact, it is difficult to obtain gels by coagulation of the whey proteins when the concentration of these proteins is less than 5% while their concentration in milk is of the order of 0.6%.

Moreover, the production technologies for cheeses or dairy products also use another starting material derived from milk: the retentate resulting from concentration of the milk by ultrafiltration. This process enables water to be removed, as well as soluble compounds such as lactose, inorganic salts or small peptides (without, however, significantly changing the concentration thereof), whereas the more bulky compounds (fat globules, proteins) do not pass through the membrane and are therefore concentrated in the retentate.

The use of retentates in cheese technology has been the subject of numerous scientific publications and patents, one of the earliest of which is French Patent 2 052 121, which describes the process known under the name MMV process.

In cheese technologies based on ultrafiltration retentate, it is sometimes desired to lower the relative proportion of lactose. This lowering may be effected by an operation known as diafiltration, which consists in adding, before, during or at the end of ultrafiltration, a known volume of water and in prolonging the ultrafiltration operation so as to remove an amount of permeate equivalent to the amount of water added. For example, in the process described in U.S. Pat. No. 4,689,234, milk is concentrated by ultrafiltration and diafiltered so as to obtain a predetermined buffering power-lactose ratio; an acid, or an acid precursor, or a lactic ferment is then added so as to obtain a pH between 4.9 and 5.3, followed by a coagulant such as rennet. The curds obtained are then converted to cheeses by the customary technological treatments.

Similarly, in the process of Patent WO 84/01268, the milk is concentrated in order to produce a retentate having a concentration factor by volume of between 2 and 8 and diafiltered so as to reduce the lactose content; the retentate is then matured so as to obtain a fall in pH of 0.05 to 1.5 unit and coagulated by rennet. The subsequent decurdling, curd-boiling and maturing treatments enable a hard cheese to be obtained.

The scientific and technical literature does not mention the possibility of coagulating the casein micelles, in a milk or a retentate, other than by the addition of coagulant enzymes, or by significant acidification (so as to obtain the isoelectric pH of the caseins), or by the combination of the two methods.

The present invention relates in particular to a novel process for the coagulation of the caseins in a milk, a dairy retentate or any other analogous protein solution capable of coagulation at the isoelectric pH, this process being based on control of the monovalent cation content.

In fact, it has been discovered that changing the alkali metal ion content, where appropriate in combination with slight acidification, permits arbitrary variation of the coagulation temperature and that, in particular, a reduction in the alkali metal ion content gives rise to a coagulation of the micelles during a moderate heat treatment.

The coagulation pHs according to this method are a long way from the isoelectric pH.

The process is not therefore one of acid coagulation. Similarly, the coagulation takes place without proteolytic action. Moreover, the coagulation temperatures used are not the temperatures at which the whey proteins are denatured, and the process operates at whey protein concentrations which are insufficient to give rise to the formation of a serum protein gel by denaturing. In fact, the process is one of coagulation of caseins.

It has been possible, in particular, to demonstrate the effect of the alkali metal minerals by determining the coagulation temperature of the caseins in a retentate concentrated 6-fold, and substantially depleted in alkali metal ions by diafiltration, and to which the various soluble elements removed with the permeate, including the inorganic salts, have been added independently in a controlled amount. At pH 6, for example, the retentate under consideration coagulates when its temperature is raised to 39° C. The addition of calcium salts (in the form of phosphates) or of magnesium salts (in the form of chloride) in an amount sufficient to restore the amount lost by diafiltration does not change the behavior of the retentate during the heat treatment in any way. The addition of lactose also has no effect. On the other hand, when sodium salts and/or potassium salts are added, the casein micelles are restabilized and the coagulation temperature is shifted towards higher values.

This result shows the significant role of the alkali metal ions in the stabilization of the suspension of casein micelles.

The coagulation process of the invention differs from conventional acid coagulation in that the micelles are neither destructured nor decalcified. It also differs from coagulation by means of rennet in that rupture of kappa-casein does not take place. The process is in fact one of casein coagulation, the serum proteins not being affected by the moderate heat treatment.

The operating conditions, that is to say the concentration of monovalent cations (sodium and/or potassium) and the pH, determine the coagulation temperature of the micelles.

Thus, by means of the choice of pH (higher than the isoelectric pH) and of the concentration of alkali metal ions it becomes possible arbitrarily to vary the coagulation temperature of milk caseins, and this coagulation is instantaneous.

The coagulation temperature varies in the same direction as the variation in the concentration of alkali metal ions and in the same direction as the variation in the pH.

For example, a milk or a dairy retentate demineralized by diafiltration and acidified to pH 5.85 coagulates at 40° C. if it has a monovalent cation content of 0.3 millimole per gram of casein; the coagulation temperature is raised to 67° C. for a monovalent cation content of 0.5 millimole per gram of casein. At pH 6.15, the first retentate (0.3 millimole per gram) coagulates at 77° C. This phenomenon is observed whatever the casein concentration, that is to say both in a milk and in a retentate obtained by ultrafiltration. When the lowering in the monovalent cation content is very substantial, coagulation may even be observed at temperatures below ambient temperature.

In French Patent Application FR 88 13899, a process for "thermocoagulation-boiling" of concentrated ultra-filtration retentates was described. In this patent application, the concentration levels by volume specifically described are always higher than 5, and it is generally necessary to use a gelling or thickening agent in order to obtain coagulated products having an acceptable consistency. Moreover, the coagulation observed is not instantaneous and requires heating times which may range up to several hours. The heat treatment described in this patent application therefore corresponds to a flocculation reaction of the denatured whey proteins, which in fact precipitate when they are in sufficient concentration, as has been mentioned above.

The present invention therefore relates to a process for instantaneous coagulation or gelling, in the absence of a coagulating agent, at a pH higher than its isoelectric pH, of a protein coagulable at the said isoelectric pH, wherein the starting material used is an aqueous solution containing, in the nondenatured state, at least one such coagulable protein, in that the alkali metal ion content in the said solution is adjusted to a predetermined value and in that the said solution, containing the said protein in a concentration of at least 1.5%, is heated to a temperature freely chosen between 20° and 100° C., on condition that the said predetermined value is such that the said protein coagulates instantaneously, at the said concentration and at the said pH higher than the isoelectric pH, at the said temperature.

It must be understood that the operation consisting in bringing the protein solution to the chosen coagulation temperature is a heating operation and the temperature of the starting solution must be chosen accordingly, that is to say lower than the chosen coagulation temperature.

By convention, in the present application, the term "aqueous protein solution" denotes either a solution or a colloidal dispersion of protein (for example a colloidal dispersion of casein micelles).

In the present application the word "coagulation" denotes the transformation of a liquid (protein solution or dispersion) into a homogeneous gel essentially occupying the volume of the initial liquid. It is known that the gel state is an intermediate state between the solid state and the liquid state, in which the polymer molecules (in this case proteins) are structured in a lattice preventing convection movements of the liquid phase. A diagrammatic idea of the structure of a gel may be given by stating that the liquid phase prevents the polymer lattice from collapsing into a compact mass, while the lattice prevents the liquid phase from flowing. Thus, in the present application, the words "coagulation" and "gelling" must be regarded as synonyms and denote a phenomenon distinct from precipitation (or flocculation) in the form of particles with no mutual organization.

It must therefore be understood that the process of the invention applies solely to proteins capable of giving rise, at their isoelectric pH, to a true coagulation reaction (as defined above) and not to a simple precipitation. Thus, for example, the process of the invention does not apply to whey proteins, which precipitate, but do not coagulate, when they are brought to their isoelectric pH. However, of course, whey proteins may be present in the starting material, alongside the caseins, and will be imprisoned, in the same way as the liquid phase, in the casein lattice after coagulation.

In particular embodiments, the process of the invention may further have the following characteristics, taken on their own or, if appropriate, in combination:
  the said protein is an animal protein such as a casein or a protein extracted from animal flesh (meat or fish flesh), or a vegetable protein, for example a soya protein;
  the said protein is a casein;
  the alkali metal ion content is adjusted, depending on the content of the starting material, either by adding sodium salts and/or potassium salts or by dilution followed by ultrafiltration (diafiltration);
  the said solution is an ultrafiltration retentate; in the said retentate the alkali metal ion content may be adjusted, in particular by diafiltration; it must be understood that the water added for the diafiltration is water having a low alkali metal ion content, for example a content of less than 20 mg per liter;
  the said solution is a milk ultrafiltration retentate; the milk is in particular cow's milk, or goat's, ewe's, cow-buffalo's milk or the like;

the pH is adjusted, if necessary, to the chosen value, either before or (most often) after adjusting the alkali metal ion content, but, of course, before the heat treatment; the pH is adjusted by the usual methods;

the said pH is higher than 5 and in particular is at least 0.5 pH unit higher than the said isoelectric pH;

the said pH is below 7;

the said pH is within the range extending from 5.5 to 6.7 and especially from 5.7 to 6.4, in particular from 5.8 to 6.3;

when the said protein is a casein, the process is preferably carried out at a pH of 5.8–6.3;

the said solution contains from 1 to 25% by weight of the said protein and generally from 2 to 20% by weight;

the said solution contains from 2 to 16% by weight of the said protein, for example from 2 to 12% by weight and in particular from 2 to 7% by weight, or even 2 to 5%;

when the said protein is casein, the said solution preferably contains from 2 to 16% by weight of by protein; and when the said protein is at least one soya protein, the said solution preferably contains from 3 to 10% by weight of protein.

The gels or coagulums obtained by the process of the invention may have different consistencies. This consistency varies in particular with the concentration of the said protein. For example, in the case of a starting material of dairy origin, the hardness of the gels is determined by the coagulation temperature (and is therefore also a function of the monovalent cation and pH parameters) and the casein content: for a casein concentration of 3%, a pH of 6.00 and a monovalent cation content of 0.12 millimole per gram of casein, the hardness of the gel obtained will be 0.02 Newton; if the casein concentration is raised to 4.5%, the other parameters being unchanged, the hardness of the gel will be 0.045 Newton, and for a casein concentration of 18% it will be (still under the same conditions) 0.74 Newton.

As indicated above, the coagulation temperature of the said protein according to the process of the invention may be arbitrarily chosen, it being possible for this temperature to be determined by simple routine experiments by varying the alkali metal ion concentration, as well as the pH, within the ranges indicated above. Experience has shown that the coagulation temperature is lowered when the alkali metal ion content is lowered (at a given pH, higher than the isoelectric pH) and that, for a given alkali metal ion content, the coagulation temperature is lowered if the pH (higher than the isoelectric pH) is lowered. It will thus be possible arbitrarily to choose a temperature lower than, for example, 85° C., or not higher than 80° C., or alternatively lower than 75° C. or than 60° C. Generally a temperature higher than or equal to 30° C. will be chosen so as not to prolong the diafiltration times excessively.

In the starting solution, the alkali metal ion content which enables a coagulation to be obtained at a given temperature, the pH being also given, is an alkali metal ion content expressed with respect to the content of the said protein.

Generally, in order to avoid obtaining a coagulation at too high a temperature, the alkali metal ion content is less than 7 millimoles per gram of the said protein; most frequently, it will be possible to work at alkali metal ion concentrations of less than 2.5 or 2 millimoles per gram of the said protein. It is, of course, possible to carry out the process at lower contents, for example contents of less than 1 millimole, 0.5 millimole, 0.3 millimole or 0.15 millimole per gram of the said protein, and the coagulation temperature will then be lower in proportion as the concentration of alkali metal ions with respect to the protein is lower.

The customary determination methods, in particular atomic absorption or methods using specific electrodes, are used to determine the alkali metal ion contents in order to optimize the coagulation conditions beforehand.

The starting solution used in the process of the invention may contain, in addition to the said protein, one or more other constituents which may be chosen in particular from:

other proteins which are noncoagulable, in particular noncoagulable in the pH range from 4.5 to 7 in a concentration of less than about 5%; this is, for example, the case for whey proteins. These proteins then act as an inert filler and do not participate in the structure of the coagulum;

sugars, for example at a concentration which may be up to 20%;

flavoring ingredients; and fats, for example vegetable fats, and the like.

For example, in the case of a dairy product, the starting solution will contain whey proteins and sugars, such as residual lactose, or added sugars.

The flavoring ingredients are, for example, natural or synthetic flavorings such as: vanilla flavoring, cheese flavoring, chocolate flavoring and the like.

The starting material which can be used to prepare the starting protein solution is, in particular, cow's, goat's or ewe's milk or milk from any other species of animal, which milk optionally contains fats and is raw or pasteurized and of which the composition in respect of caseins and monovalent cations (sodium and potassium) is known. It is also possible to use a solution of vegetable proteins, for example soya proteins, or a solution of meat or fish flesh proteins.

The content of proteins (for example caseins) necessary to obtain the desired texture may be obtained by subjecting the starting protein solution (for example the milk) to an ultrafiltration operation, and the monovalent cation content is adjusted to that necessary and sufficient to obtain the desired product, either by adding alkali metal salts or, for example, by a diafiltration operation in the case where it is desired to lower the alkali metal ion content. This diafiltration can be carried out arbitrarily at the start of, during or at the end of ultrafiltration. A modified starting material is obtained which generally has a monovalent cation content of, for example, between 0 and 7 millimoles and preferentially between 0.05 and 2 millimoles of monovalent cations per gram of the said coagulable protein. The pH of this modified starting material may then be adjusted to the desired value (for example between 5.0 and 7.0, preferably between 5.8 and 6.3) by known methods, by the addition of acid (lactic acid, hydrochloric acid or the like) or acid precursor (for example glucono-delta-lactone) or by lactic fermentation. The intermediate product obtained is then coagulated by the action of heat, for example in a Stéphan-type apparatus (with direct or indirect heating) or in exchangers in which the surface is scraped (residence time: about 10 seconds for example), or in an oven or a water bath.

The textured base obtained after coagulation may then be mixed with other ingredients, such as salt, sugars, flavorings or vegetable or animal fat, and, if necessary, withstands subsequent heat treatments such as pasteurization or sterilization treatments.

One of the advantages of the process of the invention is that it permits stable products to be obtained. In fact, it is not necessary to use either lactic ferments or coagulant enzymes in order to obtain the coagulation. It is thus possible, in particular, to produce cheese analogs which will not require maturing, provided that the flavoring is supplied by another route.

Taking a starting product of dairy origin as an example, the use of this novel process of thermocoagulation of the caseins makes it possible to obtain an entire range of textures, ranging from viscous products of the "dessert cream" type to products of the semi-hard cheese type, via soft products of the processed cheese type. As has been stated above, the hardness of the coagulum depends on the casein concentration, the monovalent cation concentration and the pH, and the texture of the products also depends on the type of heat treatment used: a heat treatment carried out using vigorous stirring will give rise to softer textures than a "static" heat treatment. The addition of monovalent cations (sodium salts and/or potassium salts), which may be necessary for the taste of the product, may be carried out after formation of the coagulum, without disturbing the texture: these added cations no longer interact with the micelle lattice formed, the coagulation not being reversible.

It is thus possible to obtain, in particular, products of the dessert cream type, the characteristic of which is that they are obtained without texturizing additives (gelling agents), or to produce products of the processed cheese type without flux salts. It is known that the "flux salts" (tartrate, citrate, polyphosphates) promote the production of homogeneous processed products in the conventional preparation of processed cheeses.

In a variant of the process it is possible to obtain cheese products of semi-hard, or even hard, texture by thermal coagulation of the caseins in equipment permitting heat treatment without a mechanical effect, for example a steam tunnel, a microwave tunnel or a baker's or butcher's oven. In this application, the starting material (having, for example, a casein content of 12 to 15% by weight) is pre-flavored, standardized in respect of fats (of animal or vegetable origin, as desired) and then distributed in molds or on a cloth, and coagulated by passing through the steam or microwave tunnel.

When it is desired to produce a product from which the lactose has been substantially removed, so as to avoid the risks of fermentation, the demineralization produced by the diafiltration necessary for removal of the lactose gives rise to coagulation at low temperature, which is liable to give rise to constraints in respect of apparatus. In this case, depending on the texture desired for the end product, the monovalent cation content may be adjusted by adding sodium salts and/or potassium salts, so as to obtain a coagulation temperature which is more easily controlled (for example higher than 30° C.).

Another variant in this case consists in concentrating the milk by ultrafiltration until the desired casein content is obtained, acidifying the product obtained to the desired pH (within the ranges mentioned above) and effecting the demineralization by electrodialysis. Depending on the temperature used for the electrodialysis operation, it is possible, at the end of the operation, to obtain a coagulum directly, or to coagulate the product by heating.

The constraints in respect of the monovalent cation content sometimes lead to deferred salting of the product, depending on the desired texture. In this case, the amount of salt (sodium chloride and/or potassium chloride) necessary for the taste of the product is supplied by sprinkling with salt or pickling in brine (or any other known process) at the end of the heat treatment. The product obtained may then be decorated, removed from the mold if necessary, packaged and cooled, before or after one or other of these operation [sic], as desired. This technology makes it possible to obtain firm cheeses or cheese analogs and also makes it possible to obtain cheese slices, when the coagulation is carried out on a cloth, in a thin layer (having, for example, a thickness of 1 to 5 mm) or by slicing the abovementioned firm textures.

The present invention also relates to a coagulum or a gel which is capable of being obtained by the coagulation process described above, in particular from a solution containing casein, such as a milk retentate.

The invention relates in particular to such a coagulum or gel which is free from gelling agent, free from coagulating agent (protease) and free from flux salts.

When the coagulum obtained according to the invention has been prepared at a sufficiently low temperature, it is substantially free from denatured proteins. For example, in the case of a dairy product coagulated at a temperature lower than 80° C., the coagulum obtained is substantially free from denatured whey proteins. One of the advantages of the process of the invention is that of obtaining coagulums, without significant syneresis, which have protein (for example casein) contents of less than 12% by weight and even less than 5% by weight.

The invention also relates to the use of a coagulum or gel, obtained by the process described above, as starting material in the preparation of a foodstuff, in particular a semi-solid or solid diary product, by the methods which have been described above.

The following examples illustrate the invention without, however, restricting it.

EXAMPLE 1

A pasteurized full-fat milk is diluted 20-fold with demineralized water and then concentrated by ultrafiltration so as to obtain a casein content equal to the initial content. The milk modified in this way contains 2.69% of caseins and 0.108 millimole of monovalent cations per gram of casein.

This milk is then matured by means of thermophilic lactic ferments added in an amount of 1%, until a pH of 6.30 is obtained, and is then subjected to a heat treatment in a Stéphan-type apparatus (indirect heating with moderate stirring), so as to bring its temperature to 60° C. At this temperature, a coagulation of the entire mass of the treated product is observed. At the end of the heat treatment, sugar (6%) and cocoa are added, the whole is mixed and the product is then divided hot (60° C.) into individual pots and then cooled. This process thus enables a product to be obtained which has a texture close to that of a yogurt, is not acid and has a chocolate flavor.

The composition of the end product is as follows: solids content: 16%, fat: 4.4%.

EXAMPLE 2

A pasteurized semi-skimmed milk (containing 2.72% of caseins and 2.308 millimoles of monovalent cations per gram of casein) is concentrated by ultrafiltration, in a manner analogous to that described in Example 1, to a concentration factor, by volume, of 6. The retentate obtained contains 34.72% of solids, 15.2% of caseins and 0.38 millimole of monovalent cations per gram of casein. The nondenatured serum proteins represent 14.7% of the total proteins.

The retentate is then acidified to pH 6.15 by adding glucono-delta-lactone and heated to 75° C. in a Stéphan-type apparatus. Coagulation is observed at a temperature of 72° C. In the coagulum, the nondenatured serum proteins then represent 14.5% of the total proteins. After cooling, the coagulum obtained is mixed with the flavoring ingredients: salt, garlic and herbs, and treated for a second time in the same mixer, up to a temperature of 80° C., so as to ensure preservation of the product. The product is dispensed hot into the packaging and covered with a lid.

The product obtained at the following composition: solids content: 36.1%; fat to solids: 15.5%. It has a processed cheese texture.

In the finished product the nondenatured serum proteins still represent 11.3% of the total proteins.

EXAMPLE 3

A skimmed milk is concentrated by ultrafiltration to a concentration factor, by volume, of 4.5; the retentate obtained contains 11.22% of casein and 0.6 millimole of monovalent cations per gram of casein. It is then diafiltered so as to obtain a monovalent cation content of 0.30 millimole per gram of casein. The casein content is 11.2%.

The retentate is then seeded with mesophilic lactic ferments in an amount of 1% and matured until a pH of 6.20 is obtained. Vegetable fat is added to the retentate so as to obtain a fat content, related to dry product, of 40%, and the product is then subjected to a heat treatment in a tubular exchanger, at 75° C., which is the coagulation temperature, for 10 seconds and is then cooled. After adding the additives necessary to obtain the organoleptic properties of the products (sugar, vanilla flavorings), a second heat treatment is carried out, so as to heat the product at 81° C. for 10 seconds.

The product obtained at (sic) the texture of a dessert cream.

EXAMPLE 4

A semi-skimmed milk is diluted 2.5-fold and then concentrated by ultrafiltration so as to obtain a retentate containing 10.1% of caseins and 0.22 millimole of monovalent cations per gram of casein.

The retentate is acidified by adding glucono-delta-lactone so as to bring its pH to 6.19. It is then subjected to a heat treatment in an apparatus having a scraped surface, at 70° C. (the coagulation taking place at 60° C.), and then cooled. A cheddar flavoring and salt are then added to the coagulum obtained and the latter is then subjected to a heat treatment in a second exchanger having a scraped surface at a temperature of 140° C. for 18 seconds and is then packaged aseptically in order to ensure preservation without refrigeration.

The product obtained is in the form of a thick cheese-flavored sauce.

EXAMPLE 5

A pasteurized full-fat milk (containing 2.49% of caseins and 2.514 millimoles of monovalent cations per gram of casein) is concentrated by ultrafiltration, until a concentration factor by volume of 5.2 is obtained, and diafiltered so as to obtain a retentate containing 12.4% of caseins and 0.2 millimole of monovalent cations per gram of casein.

The retentate is matured by means of lactic ferments, as above, to a pH of 5.85, cheese flavoring is added and the mixture is placed in a mold of the desired shape. The mold is then placed in a moist oven at a temperature of 150° C. The coagulation takes place when the product reaches a temperature of 40° C., but the heat treatment is extended so as to obtain a temperature of 80° C. at the core, in order to ensure preservation of the product. At the outlet from the oven the product is salted by sprinkling with salt (1.2%) and covered with a lid. Under these conditions a product is obtained which has an unchanging and long-lasting firm cheese texture (young reblochon).

EXAMPLE 6

The retentate obtained in Example 5 is acidified by adding glucono-delta-lactone in an amount sufficient to obtain a pH of 6.00 and a mixture of natural flavorings is added so as to impart a Beaufort cheese flavor to the mixture. The retentate is then poured onto a cloth and coagulated in a steam tunnel, so as to obtain a core temperature of 80° C. The coagulation takes place when the product reaches a temperature of 45° C. After coagulation, salt (1.2%) is added by sprinkling on and the product is sliced and packaged. This process makes it possible to obtain slices of a cheese analog which has a hard texture and a Beaufort taste.

EXAMPLE 7

A skimmed milk is concentrated by ultrafiltration, until a casein content of 11.5% is obtained. This retentate is then diafiltered so as to reduce the lactose content to a final value of 0.2% and supplementary monovalent cations (NaCl and/or KCl) are then added so as to obtain a final concentration of 0.15 millimole of monovalent cations per gram of casein. The casein content is 11.5%.

The retentate obtained is then acidified to pH 6.30, sugar and chocolate flavoring are added and the product is subjected to a heat treatment in a tubular exchanger, at 75° C. (the coagulation taking place at 65° C.), and cooled. A highly concentrated ($10^{11}$ microorganisms/ml) lactic ferment culture is then added, in an amount of 1%, and the product is packaged aseptically and stored at 4° C. The product obtained, which has a dessert cream texture, contains a large quantity of lactic microorganisms, which do not grow at the preservation temperature, and do not produce lactic acidity having an adverse effect on the perception of the chocolate taste.

EXAMPLE 8

A soya juice (containing 3.8% of proteins, 30 mg of sodium per 100 g and 160 mg of potassium per 100 g) is concentrated by ultrafiltration to a protein content of 7% and diafiltered so as to obtain a retentate containing 7% of proteins and 0.2 mmol of monovalent cations per gram of proteins. The retentate obtained is acidified by means of glucono-delta-lactone to pH 6.15, transferred to a mold and subjected to a heat treatment in a moist oven at a temperature of 150° C. Coagulation takes place when the product reaches 62° C., and the heat treatment is continued until a core temperature of 80° C. is obtained. At the outlet from the oven, the product is salted (1.2%) and packaged: a product is obtained which has a firm cheese texture and does not contain milk proteins.

We claim:

1. A process for the coagulation or gelling of an aqueous solution containing alkali metal ions and at least 1.5 weight percent of a nondenatured protein, wherein said nondenatured protein is of the type which undergoes coagulation at its isoelectric pH, said aqueous solution having a pH higher than said isoelectric pH, comprising the steps of:
   a) adjusting the alkali metal ions content of said solution and
   b) heating said solution to a selected temperature ranging from 20° to 100° C.,
   where in said step a) the resulting adjusted alkali metal ions content is such that, at said pH higher than said isoelectric pH, said nondenatured protein coagulates or gels instantaneously at said temperature.

2. The process of claim 1 wherein said protein is an animal protein.

3. The process of claim 2 wherein said animal protein is a casein.

4. The process of claim 1 wherein said protein is a vegetable protein.

5. The process of claim 4 wherein said vegetable protein is a soya protein.

6. The process of claim 1 wherein said aqueous solution is an ultrafiltration retentate.

7. The process of claim 1 wherein said alkali metal ion concentration is adjusted by diafiltration.

8. The process of claim 1 wherein said alkali metal concentration is adjusted by electrodialysis.

9. The process of claim 1 wherein said aqueous solution is an ultrafiltration retentate of milk.

10. The process of claim 9 wherein said milk is cow's milk, goat's milk or ewe's milk.

11. The process of claim 1 wherein the pH of said aqueous solution is higher than 5.

12. The process of claim 1 wherein the pH of said aqueous solution is at least 0.5 pH unit higher than the said isoelectric pH of said nondenatured protein.

13. The process of claim 1 wherein the pH of said aqueous solution ranges from 5.5 to 6.7.

14. The process of claim 1 wherein the pH of said aqueous solution ranges from 5.7 to 6.4.

15. The process of claim 1 wherein the pH of said aqueous solution ranges from 5.8 to 6.3

16. The process of claim 3 wherein the pH of said aqueous solution ranges from 5.8 to 6.3.

17. The process of claim 1 wherein said aqueous solution contains from 1 to 25 percent by weight of said nondenatured protein.

18. The process of claim 1 wherein said aqueous solution contains from 2 to 20 percent by weight of said nondenatured protein.

19. The process of claim 1 wherein said aqueous solution contains from 2 to 16 percent by weight of said nondenatured protein.

20. The process of claim 1 wherein said aqueous solution contains from 2 to 12 percent by weight of said nondenatured protein.

21. The process of claim 3 wherein said aqueous solution contains from 2 to 7 percent by weight of said casein.

22. The process of claim 3 wherein said aqueous solution contains from 2 to 5 percent by weight of said casein.

23. The process of claim 5 wherein said aqueous solution contains from 3 to 10 percent by weight of soya protein.

24. The process of claim 1 wherein said aqueous solution is heated to a temperature lower than 85° C.

25. The process of claim 1 wherein said aqueous solution is heated to a temperature not higher then 80° C.

26. The process of claim 1 wherein said aqueous solution is heated to a temperature lower than 75° C.

27. The process of claim 1 wherein said aqueous solution is heated to a temperature lower than 60° C.

28. The process of claim 1 wherein said aqueous solution is heated to a temperature higher than or equal to 30° C.

29. The process of claim 1 wherein said alkali metal ion content is less than 7 millimoles per gram of said nondenatured protein.

30. The process of claim 1 wherein said alkali metal ion content is less than 2.5 millimoles per gram of said nondenatured protein.

31. The process of claim 1 wherein said alkali metal ion content ranges from 0.05 to 2 millimoles per gram of said nondenatured protein.

32. The process of claim 1 wherein said alkali metal ion content is less than 1 millimole per gram of said nondenatured protein.

33. The process of claim 1 wherein said alkali metal ion content is less than 0.5 millimole per gram of said nondenatured protein.

34. The process of claim 1 wherein said alkali metal ion content is less than 0.3 millimole per gram of said nondenatured protein.

35. The process of claim 1 wherein said alkali metal is less than 0.15 millimole per gram of said nondenatured protein.

36. The process of claim 1 wherein said aqueous solution also contains at least one constituent selected from the group consisting of a protein which is noncoaguable at a pH ranging from 4.5 to 7 at a concentration less than 5 weight percent; a sugar; a flavoring ingredient; and a fat.

37. A coagulum or gel capable of being obtained by the process of claim 1.

38. The coagulum or gel of claim 37 obtained from an aqueous solution containing casein.

39. The coagulum or gel of claim 38 which is obtained from a milk retentate.

40. The coagulum or gel of claim 38 which is free from protease.

41. The coagulum or gel of claim 38 which is substantially free from denatured proteins.

42. The coagulum or gel of claim 38 wherein the content of nondenatured protein is less than 12 weight percent.

43. The coagulum or gel of claim 38 wherein the content of nondenatured protein is less than 5 weight percent.

* * * * *